Jan. 5, 1926.
C. A. BARRY
TRACTOR HITCH
Filed Nov. 21, 1924
1,568,867
2 Sheets-Sheet 1
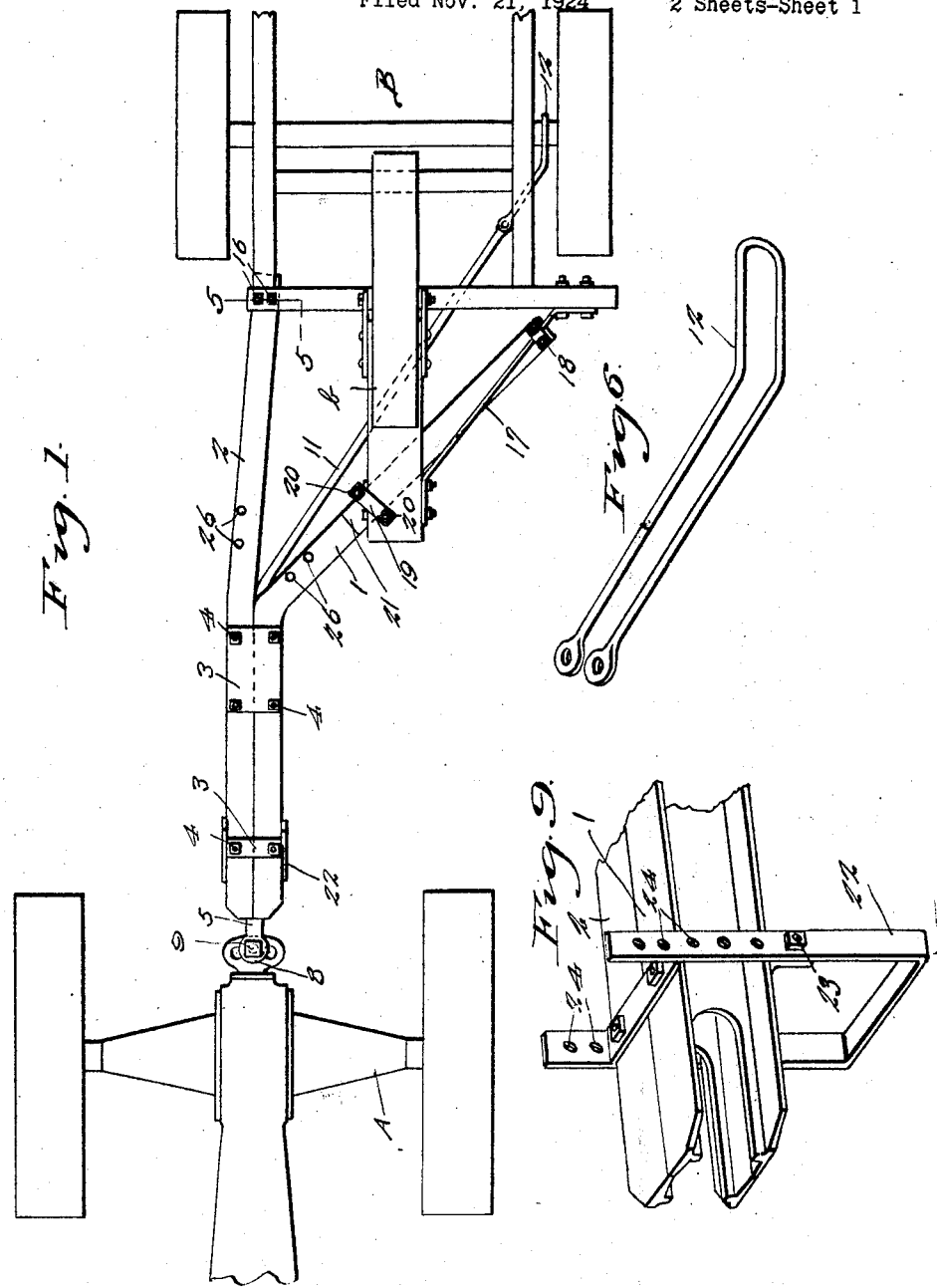

Jan. 5, 1926.　　　　C. A. BARRY　　　　1,568,867
TRACTOR HITCH
Filed Nov. 21, 1924　　　2 Sheets-Sheet 2
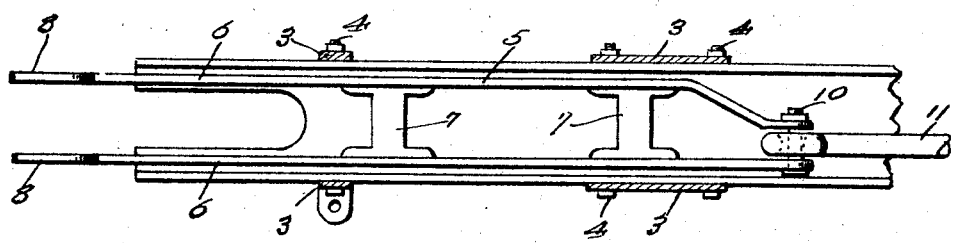
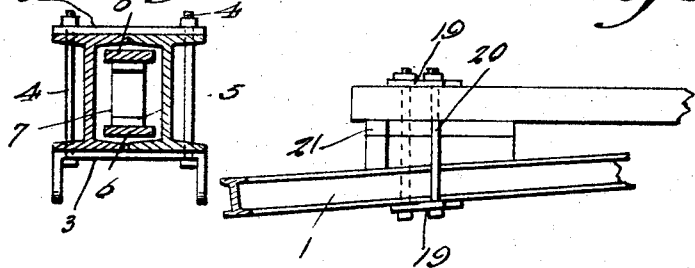
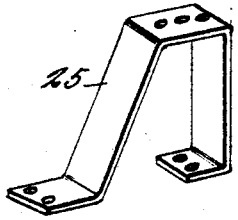
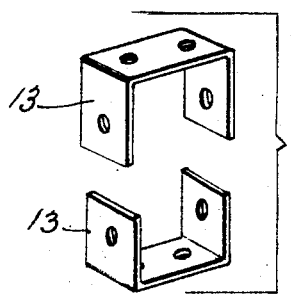
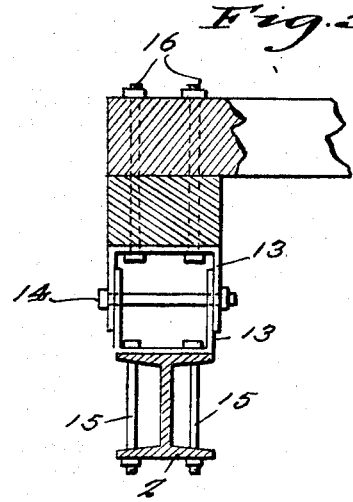
C. A. Barry, INVENTOR Patented Jan. 5, 1926.

1,568,867

UNITED STATES PATENT OFFICE.

CARLOS A. BARRY, OF SUTHERLAND, IOWA.

TRACTOR HITCH.

Application filed November 21, 1924. Serial No. 751,371.

*To all whom it may concern:*

Be it known that I, CARLOS A. BARRY, a citizen of the United States, residing at Sutherland, in the county of O'Brien and State of Iowa, have invented new and useful Improvements in Tractor Hitches, of which the following is a specification.

This invention relates to an improved hitch for connecting a tractor to an implement, such as a corn picker, the general object of the invention being to provide means for attaching the front part of the implement to the tractor so that the tongue truck can be eliminated, and the weight, formally carried by such truck, carried by the tractor.

Another object of the invention is to eliminate the side draft and to permit the tractor to travel over that part of the field which has already been passed over by the implement.

A further object of the invention is to provide means whereby the implement can be attached to different types of tractors and a tractor attached to different types of implements.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view showing the invention in use.

Figure 2 is an elevation showing the manner of attaching the hitch to the tractor.

Figure 3 is a side view showing the means for connecting the hitch to the short tongue of the implement.

Figure 4 is a section on line 4—4 of Figure 2.

Figure 5 is a section on line 5—5 of Figure 1.

Figure 6 is a view of the clevis for connecting the draft rod to the implement.

Figure 7 is a view of the bracket for connecting the hitch to a part of the implement.

Figure 8 is a view of the bracket which may be used with the hitch.

Figure 9 is a view of a support for holding the hitch in raised position when detached from the tractor.

In these views, A indicates a tractor and B a corn picker or other implement. In carrying out my invention I provide a main beam 1 and a supporting beam 2 which are preferably of I beam construction. The front parts of the beams extend parallel and abut each other with the rear parts separated and extending at different angles to the front of the picker, the beam 2 being almost straight, and the rear part of the beam 1 extending upwardly at an angle. The front ends of the beams are connected together by a number of pairs of upper and lower plates 3 and the bolts 4 which pass through the plates and through portions of the beams. A draw bar 5 extends into the space formed by the beams at the front thereof, this draw bar being composed of upper and lower pieces 6 and the eye pieces 7 which connect the pieces 6 together. The pieces 6 are provided with eyes 8 at their front ends so that the draw bar can be fastened to the draw bar of the tractor by the usual coupling pin shown at 9 in Figure 1. A coupling bolt 10 connects the rear end of the draw bar to a draft bar 11 which projects into the rear part of the space formed by the parallel portions of the beams 1 and 2 and said draft bar extends at an angle to the left hand part of the implement to which it is connected by a long U-shaped clevis 12. The rear end of the beam 2 is connected with the right hand side of the picker by the U-shaped brackets 13 and the pin or bolt 14 which forms a hinge connection between the beam and picker. One bracket 13 is bolted to the top of the beam by the bolts 15 and the other bracket is bolted to the picker by the bolts 16 with the limbs of one bracket overlapping the limbs of the other and the bolt 14 passing through the holes in said limbs. The beam 1 is fastened to a brace 17 of the implement by the clamps 18 and said beam is also fastened to the short tongue *b* of the implement by the clamping plates 19 and the bolts 20. Blocks 21 are placed between the tongue *b* and the beam and these blocks are beveled so that the tongue can be adjusted towards and from the beam by moving one block upon the other, thus enabling the implement to be properly adjusted and also permitting the implement to be used with different types of tractors or a tractor with different types of implements.

This adjustment is made after the clamp 18 is loosened and as this adjustment is being made, the member 2 will move on the hinge bolt 14 so that it is not necessary to touch the connection between member 2 and the implement. The front ends of the members 1 and 2 have their webs cut away as shown in Figures 2 and 9 so as to not interfere with the turning movement of the tractor implement by permitting the draw bar of the tractor, when the same is of considerable size, to enter the opening formed by the cut-away portions. A yoke-shaped frame 22 is fastened to the front end of the hitch by the bolt 23 which passes through the front ends of the beams and through any one of a plurality of pairs of holes 24 made in the yoke to hold the front end of the hitch off the ground when the hitch is disconnected from the tractor.

I also provide the bracket 25 which may be bolted to the beams 1 and 2 by the bolts which pass through the bracket and the holes 26 formed in the beams, this bracket being designed to support a shaft when the picker is to be driven by power.

From the foregoing it will be seen that I have provided means for supporting the front end of an implement from the tractor so that the front truck of the implement can be omitted and which gives better traction for the tractor on account of the extra weight. This device will also eliminate side draft and permits the tractor to run over that part of the field that has been picked. By using different sizes of blocks the device can be adjusted to suit different tractors and implements. The draft bar and draw bar are also so arranged that the entire pulling strain is taken by these parts and thus the beams 1 and 2 and their connections are not subject to this strain.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a tractor and an implement, a frame having one end supported on the tractor and its other end attached to the implement, the rear part of the frame extending at an angle so that the implement will not track the tractor and a draw bar and draft bar connecting the implement with the tractor and taking the entire pulling strain.

2. In combination with a tractor and an implement, a pair of beams having straight front parts which abut each other and angularly arranged rear parts, the rear part of one beam extending at a greater angle than the other and also extending upwardly at an incline, means for fastening the front ends of the beams together, means for clamping the rear ends of the beams to a part of the implement, a draw bar for supporting the front ends of the beams from the tractor and a draft bar for connecting the draw bar with an implement.

3. In combination with a tractor and an implement, a pair of beams having straight front parts and angularly arranged rear parts, the rear part of one beam extending at a greater angle than the other beam and extending upwardly at an angle, means for clamping the ends of the beams to a part of the implement, adjustable means for fastening the upwardly extending part of one beam to the tongue of the implement, plates for connecting the front ends of the beams together, a draw bar arranged in the space between the front ends of the beams and a draft bar for connecting the draw bar with the implement.

4. In combination with a tractor and an implement, a pair of beams having straight front parts which abut each other and angularly arranged rear parts, means for connecting the front ends of the beams together, a draw bar slidably mounted in the space between the front ends of the beams and adapted to be connected with the tractor, a draft bar pivoted to the rear end of the draw bar, a long clevis for connecting the rear end of the draft bar with the implement, means for hingedly connecting one beam to the implement, and means for clamping the other beam to the implement.

5. In combination with a tractor and an implement, a pair of beams having straight front parts which abut each other and angularly arranged rear parts, means for connecting the front ends of the beams together, a draw bar slidably mounted in the space between the front ends of the beams and adapted to be connected with the tractor, a draft bar pivoted to the rear end of the draw bar, a long clevis for connecting the rear end of the draft bar with the implement, means for hingedly connecting one beam to the implement, means for clamping the other beam to the implement, a yoke-shaped frame adapted to be connected with the front end of the hitch for supporting the same off the ground and a bracket adapted to be bolted to the hitch.

6. In combination with a tractor and an implement, a frame having one end supported on the tractor and its other end attached directly to the implement so as to eliminate the tongue truck of an implement, the rear part of the frame being offset from the front part so that the implement will not track the tractor and draft means for connecting the implement with the tractor for relieving the frame from the pulling strain.

In testimony whereof I affix my signature.

CARLOS A. BARRY.